(12) United States Patent
Cheng

(10) Patent No.: US 10,402,712 B1
(45) Date of Patent: Sep. 3, 2019

(54) FINGERPRINT RECOGNITION SMART CARD

(71) Applicant: BEAUTIFUL CARD CORPORATION, Taoyuan (TW)

(72) Inventor: Meng-Jen Cheng, Taoyuan (TW)

(73) Assignee: BEAUTIFUL CARD CORPORATION (TW)

( * ) Notice: Subject to any disclaimer, the term of this patent is extended or adjusted under 35 U.S.C. 154(b) by 0 days.

(21) Appl. No.: 16/024,964

(22) Filed: Jul. 2, 2018

(51) Int. Cl.
*G06K 19/073* (2006.01)
*G06K 7/00* (2006.01)
*G06K 9/00* (2006.01)

(52) U.S. Cl.
CPC ..... *G06K 19/07354* (2013.01); *G06K 7/0021* (2013.01); *G06K 9/00087* (2013.01)

(58) Field of Classification Search
CPC ............... G06K 19/07354; G06K 9/00087
USPC .......................................... 340/5.52
See application file for complete search history.

(56) References Cited

U.S. PATENT DOCUMENTS

| 2006/0107067 A1* | 5/2006 | Safal | G06K 9/00885 713/186 |
| 2007/0186116 A1* | 8/2007 | Clemmensen | G06F 21/32 713/186 |
| 2008/0158779 A1* | 7/2008 | Lin | C23C 14/205 361/502 |
| 2008/0223925 A1* | 9/2008 | Saito | G06Q 20/341 235/380 |

* cited by examiner

*Primary Examiner* — Vernal U Brown
(74) *Attorney, Agent, or Firm* — Schmeiser, Olsen & Watts, LLP

(57) ABSTRACT

A fingerprint recognition smart card has a card body, a transaction processing unit, a switch unit, and a fingerprint recognition unit. The transaction processing unit is disposed at the card body. The switch unit is disposed at the card body and circuit-connected to the transaction processing unit. The fingerprint recognition unit is disposed at the card body and circuit-connected to the transaction processing unit and the switch unit. Therefore, after the transaction processing unit has received external power, the fingerprint recognition unit receives and analyzes a cardholder's fingerprint data such that, depending on an analysis result of the fingerprint data, the switch unit starts the transaction processing unit for conducting a transaction with a reading apparatus or shuts down the transaction processing unit to preclude any transaction. Therefore, the fingerprint recognition smart card enhances transaction safety and convenience.

11 Claims, 5 Drawing Sheets

FINGERPRINT RECOGNITION SMART CARD

FIELD OF THE INVENTION

The present disclosure relates to fingerprint recognition smart cards and, more particularly, to a smart card capable of fingerprint recognition.

BACKGROUND OF THE INVENTION

Conventional electronic smart cards, such as debit cards, credit cards, prepaid cards, and MetroCards, usually undergo user authentication, using a password, before being used to conduct a transaction.

By contrast, conventional electronic transaction cards often fall victim to theft and fraud, as the cards seldom come with any mechanism for recognizing cardholders. Furthermore, odds are the cardholders have their personal data and transaction data stolen during or after transactions conducted with the cards, because the cards are not designed to show a transaction status, and thus the cardholders are informed only by goods sellers (or service providers) of completion of the transactions conducted with the cards. Moreover, it is not uncommon that the cardholders forget their passwords or have their passwords stolen. For the above reasons, conventional smart cards are hardly safe and convenient to conduct a transaction.

Therefore, it is imperative to provide a fingerprint recognition smart card capable of recognizing a cardholder's fingerprint data and then determining, according to an analysis result of the fingerprint data, whether a proposed transaction is safe to accept, so as enhance the safety and convenience of the transaction.

SUMMARY OF THE INVENTION

In view of the aforesaid drawbacks of the prior art, it is an objective of the present disclosure to provide a fingerprint recognition smart card capable of receiving and recognizing a cardholder's fingerprint data and then determining, according to an analysis result of the fingerprint data, whether a proposed transaction is safe to accept, so as enhance the safety and convenience of the transaction.

In order to achieve the above and other objectives, the present disclosure provides a fingerprint recognition smart card. The fingerprint recognition smart card comprises a card body, a transaction processing unit, a switch unit and a fingerprint recognition unit. The transaction processing unit is disposed at the card body. The transaction processing unit functions as a power supply and conducts a transaction with a reading apparatus. The switch unit is disposed at the card body and circuit-connected to the transaction processing unit. The switch unit starts or shuts down the transaction processing unit. The fingerprint recognition unit is disposed at the card body and circuit-connected to the transaction processing unit and the switch unit. The fingerprint recognition unit receives and analyzes a cardholder's fingerprint data. Depending on an analysis result of the fingerprint recognition unit, the switch unit starts or shuts down the transaction processing unit.

Regarding the fingerprint recognition smart card, the transaction processing unit comprises a contact chip, a signal line assembly, and a power management module. The contact chip is circuit-connected to the signal line assembly and the power management module. The signal line assembly is circuit-connected to the switch unit. The power management module is circuit-connected to the switch unit and the fingerprint recognition unit.

Regarding the fingerprint recognition smart card, the transaction processing unit comprises a non-contact chip, a signal line assembly, a power management module, an antenna, and an energy-storage capacitor. The non-contact chip is circuit-connected to the signal line assembly and the antenna. The signal line assembly is circuit-connected to the switch unit. The power management module is circuit-connected to the antenna, the energy-storage capacitor, the switch unit, and the fingerprint recognition unit.

Regarding the fingerprint recognition smart card, the transaction processing unit comprises a dual-interface chip, a signal line assembly, a power management module, an antenna, and an energy-storage capacitor. The dual-interface chip is circuit-connected to the signal line assembly, the power management module and the antenna. The signal line assembly is circuit-connected to the switch unit. The power management module is circuit-connected to the antenna, the energy-storage capacitor, the switch unit, and the fingerprint recognition unit.

Regarding the fingerprint recognition smart card, the energy-storage capacitor is a hard supercapacitor or a flexible supercapacitor.

Regarding the fingerprint recognition smart card, the transaction processing unit comprises a contact chip, a signal line assembly, a power management module, and a secondary battery. The contact chip is circuit-connected to the signal line assembly and the power management module. The signal line assembly is circuit-connected to the switch unit. The power management module is circuit-connected to the secondary battery, the switch unit and the fingerprint recognition unit.

Regarding the fingerprint recognition smart card, the transaction processing unit comprises a non-contact chip, a signal line assembly, a power management module, an antenna, and a secondary battery. The non-contact chip is circuit-connected to the signal line assembly and the antenna. The signal line assembly is circuit-connected to the switch unit. The power management module is circuit-connected to the antenna, the secondary battery, the switch unit, and the fingerprint recognition unit.

Regarding the fingerprint recognition smart card, the transaction processing unit comprises a dual-interface chip, a signal line assembly, a power management module, an antenna, and a secondary battery. The dual-interface chip is circuit-connected to the signal line assembly, the power management module and the antenna. The signal line assembly is circuit-connected to the switch unit. The power management module is circuit-connected to the antenna, the secondary battery, the switch unit, and the fingerprint recognition unit.

Regarding the fingerprint recognition smart card, The fingerprint recognition smart card of claim 1, wherein the switch unit comprises an MOSFET, a diode, a plurality of resistors, a plurality of capacitors, and a bipolar junction transistor (BJT). The MOSFET is connected to the fingerprint recognition unit. The diode is connected to the MOSFET. The resistors and the capacitors are each connected to the MOSFET. The bipolar junction transistor is connected to the diode, one of the resistors, and one of the capacitors. The bipolar junction transistor is connected to the transaction processing unit through the resistor.

Regarding the fingerprint recognition smart card, the switch unit comprises an MOSFET, a diode, a plurality of resistors, a plurality of capacitors, and a bipolar junction transistor (BJT). The MOSFET is connected to the fingerprint recognition unit. The diode is connected to the MOSFET. The resistors and the capacitors are each connected to the MOSFET. The bipolar junction transistor is connected to the diode, one of the resistors, and one of the capacitors. The bipolar junction transistor is connected to the transaction processing unit.

Regarding a fingerprint recognition smart card of the present disclosure, a transaction processing unit receives external power to enable a fingerprint recognition unit to receive and analyze a cardholder's fingerprint data such that, depending on a result of analysis of the fingerprint data, a switch unit starts the transaction processing unit for conducting a transaction with a reading apparatus or shuts down the transaction processing unit to preclude any transaction. Therefore, the fingerprint recognition smart card enhances transaction safety and convenience.

DETAILED DESCRIPTION OF THE PREFERRED EMBODIMENTS

Objectives, features, and advantages of the present disclosure are hereunder illustrated with specific embodiments, depicted by the accompanying drawings, and described in detail below.

Figure 1:
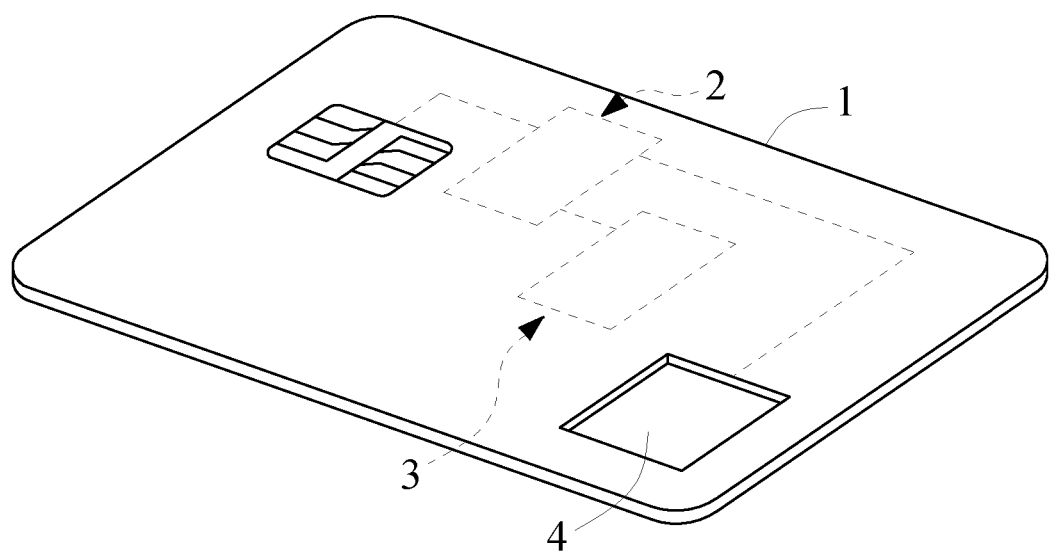
FIG. 1 is a perspective view of a fingerprint recognition smart card according to the first embodiment of the present disclosure.
Figure 2:
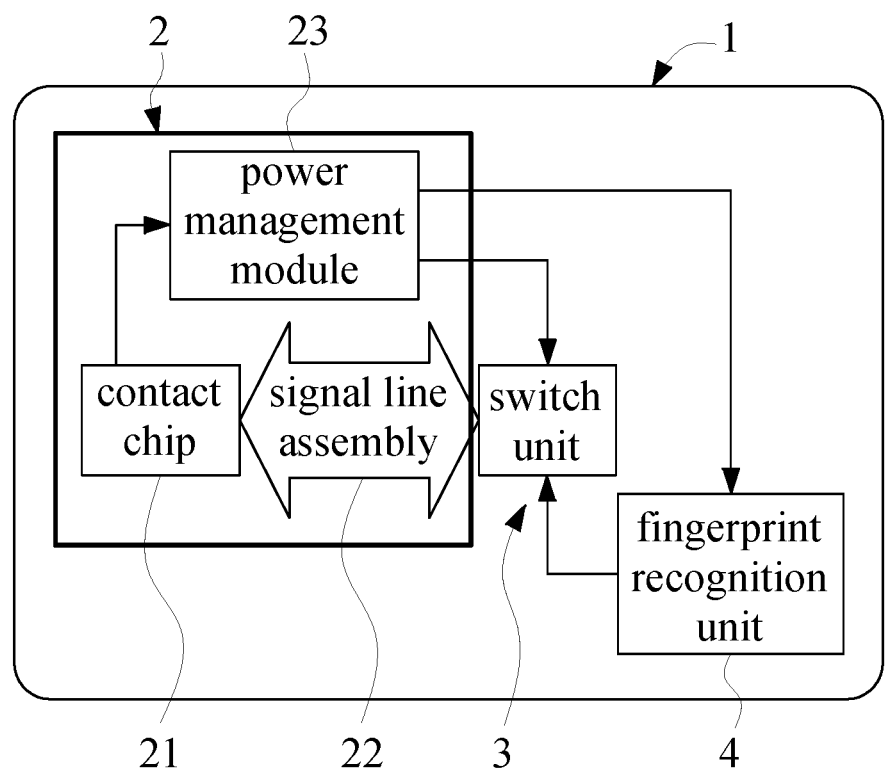
FIG. 2 is a block diagram of the fingerprint recognition smart card according to the first embodiment of the present disclosure.
Figure 3:
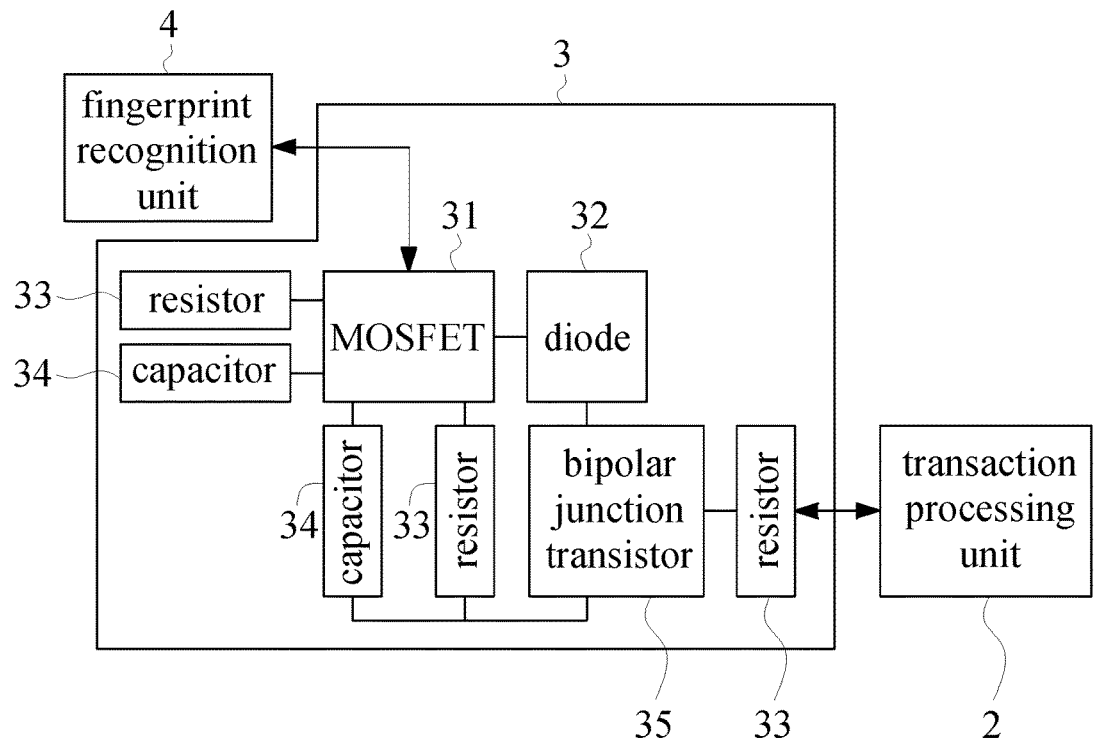
FIG. 3 is a block diagram of a switch unit of the fingerprint recognition smart card according to the first embodiment of the present disclosure.

Referring to FIG. 1 through FIG. 3, a fingerprint recognition smart card of the present disclosure comprises a card body 1, a transaction processing unit 2, a switch unit 3 and a fingerprint recognition unit 4.

The card body 1 carries the transaction processing unit 2, the switch unit 3 and the fingerprint recognition unit 4.

The transaction processing unit 2 is disposed at the card body 1. The transaction processing unit 2 functions as a power supply and conducts a transaction with a reading apparatus (not shown).

The switch unit 3 is disposed at the card body 1 and circuit-connected to the transaction processing unit 2. The switch unit 3 starts or shuts down the transaction processing unit 2.

The fingerprint recognition unit 4 is disposed at the card body 1 and circuit-connected to the transaction processing unit 2 and the switch unit 3. The fingerprint recognition unit 4 receives and analyzes a user's fingerprint data such that the switch unit 3 starts or shuts down the transaction processing unit 2 in accordance with an analysis result of the fingerprint recognition unit 4.

A process of conducting a transaction is described below. The reading apparatus supplies power to the transaction processing unit 2 such that, after receiving the external power, the transaction processing unit 2 can supply power to the switch unit 3 and the fingerprint recognition unit 4. A cardholder touches the fingerprint recognition unit 4 with his or her finger (i.e., the finger with its fingerprint configured for use in fingerprint recognition.) The fingerprint recognition unit 4 receives and analyzes the fingerprint. If the fingerprint recognition unit 4 confirms that the fingerprint belongs to the cardholder, the fingerprint recognition unit 4 renders the switch unit 3 open, and thus the switch unit 3 starts the transaction processing unit 2 to render transactions possible. Conversely, after receiving and analyzing the fingerprint, if the fingerprint recognition unit 4 confirms that the fingerprint does not belong to the cardholder, the fingerprint recognition unit 4 renders the switch unit 3 closed, and thus the switch unit 3 shuts down the transaction processing unit 2 to preclude any transaction. Therefore, the fingerprint recognition smart card enhances transaction safety and convenience.

In an embodiment of the present disclosure, the transaction processing unit 2 comprises a contact chip 21, a signal line assembly 22 and a power management module 23. The contact chip 21 is circuit-connected to the signal line assembly 22 and the power management module 23. The signal line assembly 22 is circuit-connected to the switch unit 3. The power management module 23 is circuit-connected to the switch unit 3 and the fingerprint recognition unit 4. Therefore, the present disclosure provides a battery-free, contact fingerprint recognition smart card.

The signal line assembly 22 comprises a power line (VCC), a ground line (GND), a reset signal line (RST), a clock signal line (CLK), and a data transmission signal line (I/O) (not shown). A preferred embodiment of the present disclosure is exemplified by connecting the switch unit 3 to the ground line, reset signal line, clock signal line, and data transmission signal line. In practice, the switch unit 3 is connected to any feasible combination of the aforesaid lines of the signal line assembly 22 as needed.

To conduct a contact transaction, the cardholder inserts the card body 1 into the reading apparatus (not shown) so as for the contact chip 21 to come into electrical contact with the reading apparatus, allowing the reading apparatus to supply power to the transaction processing unit 2 through the contact chip 21. At this point in time, the power management module 23 stabilizes the operating voltage and supplies power to the switch unit 3 and the fingerprint recognition unit 4. Afterward, the cardholder touches the fingerprint recognition unit 4 with his or her finger (i.e., the finger with its fingerprint configured for use in fingerprint recognition.) The fingerprint recognition unit 4 receives and analyzes the fingerprint. If the fingerprint recognition unit 4 confirms that the fingerprint belongs to the cardholder, the fingerprint recognition unit 4 renders the switch unit 3 open, and thus the ground line and reset signal line of the signal line assembly 22 are not connected (i.e., are separated from each other and thus do not interfere with each other), allowing the switch unit 3 to function and start the transaction processing unit 2 so as to permit transactions.

Conversely, after receiving and analyzing the fingerprint, if the fingerprint recognition unit 4 confirms that the fingerprint does not belong to the cardholder, the fingerprint recognition unit 4 renders the switch unit 3 closed such that the ground line and reset signal line of the signal line assembly 22 connect to each other and thus interfere with each other to the detriment of operation thereof, thereby causing the switch unit 3 to shut down the transaction processing unit 2 and thus preclude any transaction. Therefore, the fingerprint recognition smart card enhances transaction safety and convenience.

Moreover, if the fingerprint recognition unit 4 is not configured with the cardholder's fingerprint, the fingerprint recognition unit 4 renders the switch unit 3 closed such that the ground line and reset signal line of the signal line assembly 22 connect to each other and thus interfere with each other to the detriment of operation thereof, thereby causing the switch unit 3 to shut down the transaction processing unit 2 and thus preclude any transaction.

In an embodiment of the present disclosure, the switch unit 3 (shown in FIG. 3) comprises an MOSFET 31, a diode 32, a plurality of resistors 33, a plurality of capacitors 34, and a bipolar junction transistor (BJT) 35. The MOSFET 31 is connected to the fingerprint recognition unit 4. The diode 32 is connected to the MOSFET 31. The resistors 33 and the capacitors 34 are each connected to the MOSFET 31. The bipolar junction transistor 35 is connected to the diode 32, one of the resistors 33, and one of the capacitors 34. The bipolar junction transistor 35 is connected to the transaction processing unit 2 through the resistor 33. When connected to the transaction processing unit 2 through the resistor 33, the bipolar junction transistor 35 is connected to the ground line, reset signal line, clock signal line and data transmission signal line (not shown) of the signal line assembly 22. The aforesaid components of the switch unit 3 are not restricted to the aforesaid embodiment and thus are subject to changes in terms of their connection. In practice, the switch unit 3 is an integrated circuit or a single chip as needed.

In an embodiment of the present disclosure, the fingerprint recognition unit 4 is a hard fingerprint recognition unit or a flexible fingerprint recognition unit, so as to meet user needs and production requirements.

Figure 4:
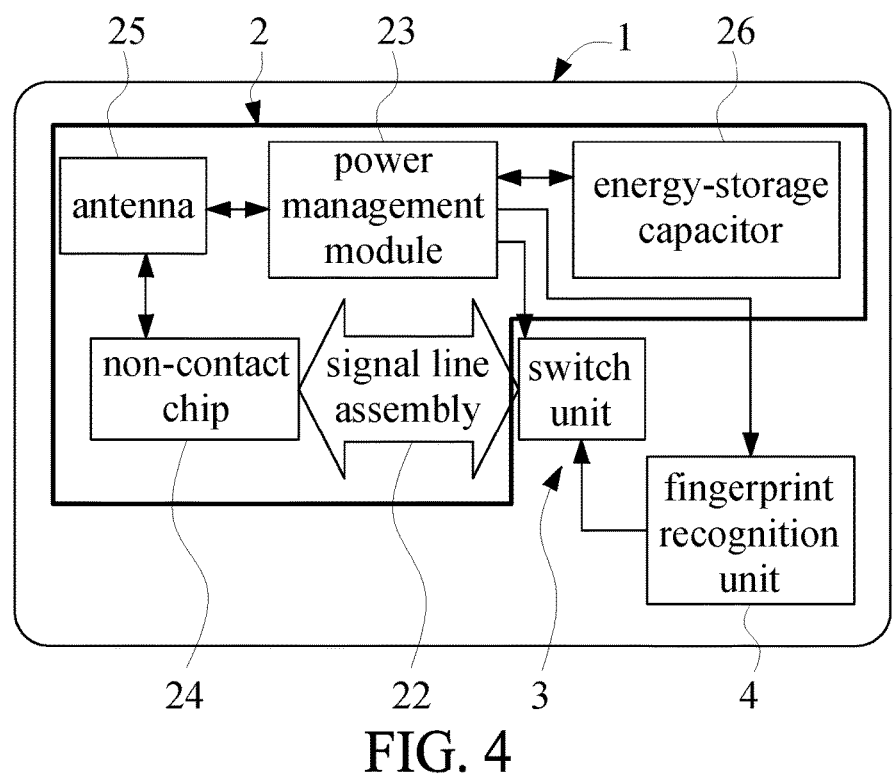
FIG. 4 is a block diagram of the fingerprint recognition smart card according to the second embodiment of the present disclosure.
Figure 5:
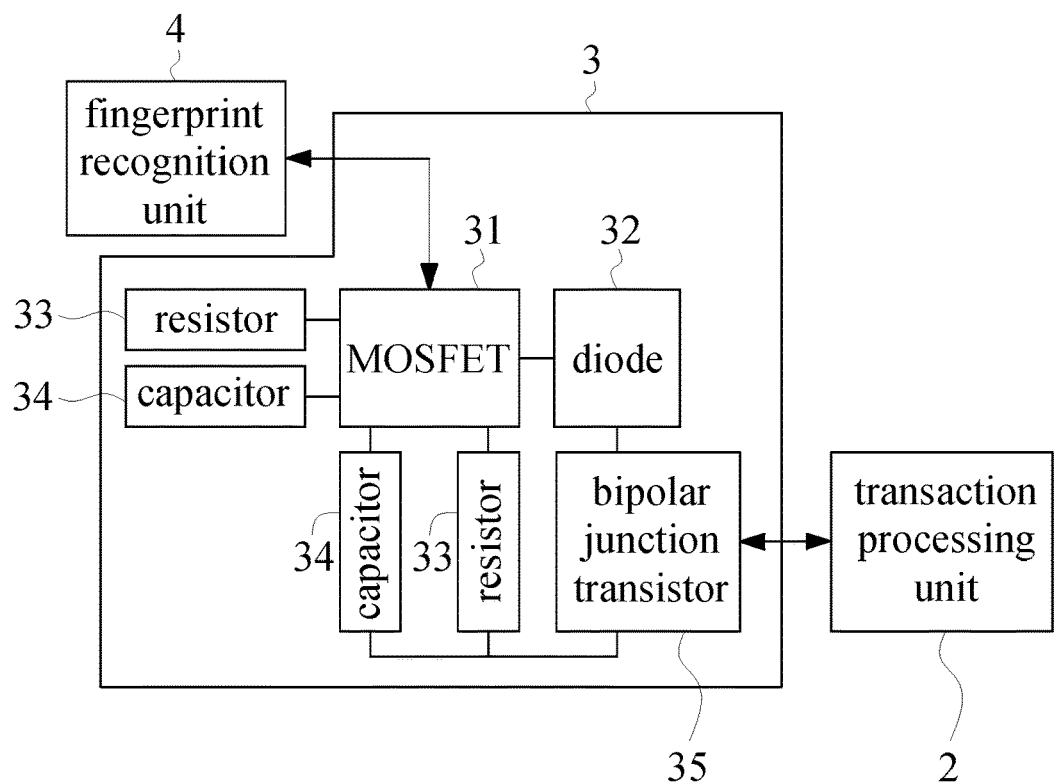
FIG. 5 is a block diagram of the switch unit of the fingerprint recognition smart card according to the second embodiment of the present disclosure.

Referring to FIG. 4 and FIG. 5, in the second embodiment of the present disclosure, the transaction processing unit 2 comprises a non-contact chip 24, a signal line assembly 22, a power management module 23, an antenna 25 and an energy-storage capacitor 26. The non-contact chip 24 is circuit-connected to the signal line assembly 22 and the antenna 25. The signal line assembly 22 is circuit-connected to the switch unit 3. The power management module 23 is circuit-connected to the antenna 25, the energy-storage capacitor 26, the switch unit 3 and the fingerprint recognition unit 4. The energy-storage capacitor 26 is a hard supercapacitor or a flexible supercapacitor. Therefore, the present disclosure provides a battery-free, non-contact fingerprint recognition smart card.

Moreover, regarding the battery-free, non-contact fingerprint recognition smart card in this embodiment, the signal line assembly 22 comprises a line (VCC), a ground line (GND), a reset signal line (RST), a clock signal line (CLK), a data transmission signal line (I/O), a first antenna-end signal line (ANT1), and a second antenna-end signal line (ANT2) (not shown). The embodiment of the present disclosure is exemplified by connecting the switch unit 3 to the ground line, first antenna-end signal line, and second antenna-end signal line. In practice, the switch unit 3 is connected to any feasible combination of the aforesaid lines of the signal line assembly 22 as needed.

Referring to FIG. 5, the switch unit 3 comprises an MOSFET 31, a diode 32, a plurality of resistors 33, a plurality of capacitors 34, and a bipolar junction transistor 35(BJT). The MOSFET 31 is connected to the fingerprint recognition unit 4. The diode 32 is connected to the MOSFET 31. The resistors 33 and the capacitors 34 are each connected to the MOSFET 31. The bipolar junction transistor 35 is connected to the diode 32, one of the resistors 33, and one of the capacitors 34. The bipolar junction transistor 35 is connected to the transaction processing unit 2. When connected to the transaction processing unit 2, the bipolar junction transistor 35 is connected to the ground line, first antenna-end signal line, and second antenna-end signal line (not shown) of the signal line assembly 22. The aforesaid components of the switch unit 3 are not restricted to the aforesaid embodiment and thus are subject to changes in terms of their connection. In practice, the switch unit 3 is an integrated circuit or a single chip as needed.

To conduct a non-contact transaction with the card body 1, the cardholder puts the card body 1 near the reading apparatus (not shown) and thus allows the antenna 25 to receive electromagnetic wave from the reading apparatus so as to generate, by sensing, and transmit power to the non-contact chip 24 of the transaction processing unit 2. At this point in time, the power management module 23 stabilizes the operating voltage, and a portion of the power is stored in the energy-storage capacitor 26. After receiving the external power, the power management module 23 of the transaction processing unit 2 supplies power to the switch unit 3 and the fingerprint recognition unit 4. The cardholder touches the fingerprint recognition unit 4 with his or her finger (i.e., the finger with its fingerprint configured for use in fingerprint recognition.) After receiving and analyzing the fingerprint, if the fingerprint recognition unit 4 confirms that the fingerprint belongs to the cardholder, the fingerprint recognition unit 4 renders the switch unit 3 open, and thus the ground line and reset signal line of the signal line assembly 22 are not connected (i.e., are separated from each other and thus do not interfere with each other), allowing the switch unit 3 to function and start the transaction processing unit 2 so as to permit a transaction. Upon completion of the transaction, the user removes the card body 1, and thus the antenna 25 cannot receive any electromagnetic wave from the reading apparatus, allowing power interruption to occur. Hence, the fingerprint recognition unit 2 and the fingerprint recognition unit 4 shut down.

Conversely, after receiving and analyzing the fingerprint, if the fingerprint recognition unit 4 confirms that the fingerprint does not belong to the cardholder, the fingerprint recognition unit 4 renders the switch unit 3 closed such that the ground line and reset signal line of the signal line assembly 22 connect to each other and thus interfere with each other to the detriment of operation thereof, thereby causing the switch unit 3 to shut down the transaction processing unit 2 and thus preclude any transaction. Therefore, the fingerprint recognition smart card enhances transaction safety and convenience.

Moreover, after the antenna 25 has received external power through the reading apparatus, the energy-storage capacitor 26 can be charged, and thus the energy-storage capacitor 26 can supply backup power whenever the antenna 25 fails to receive power.

Figure 6:
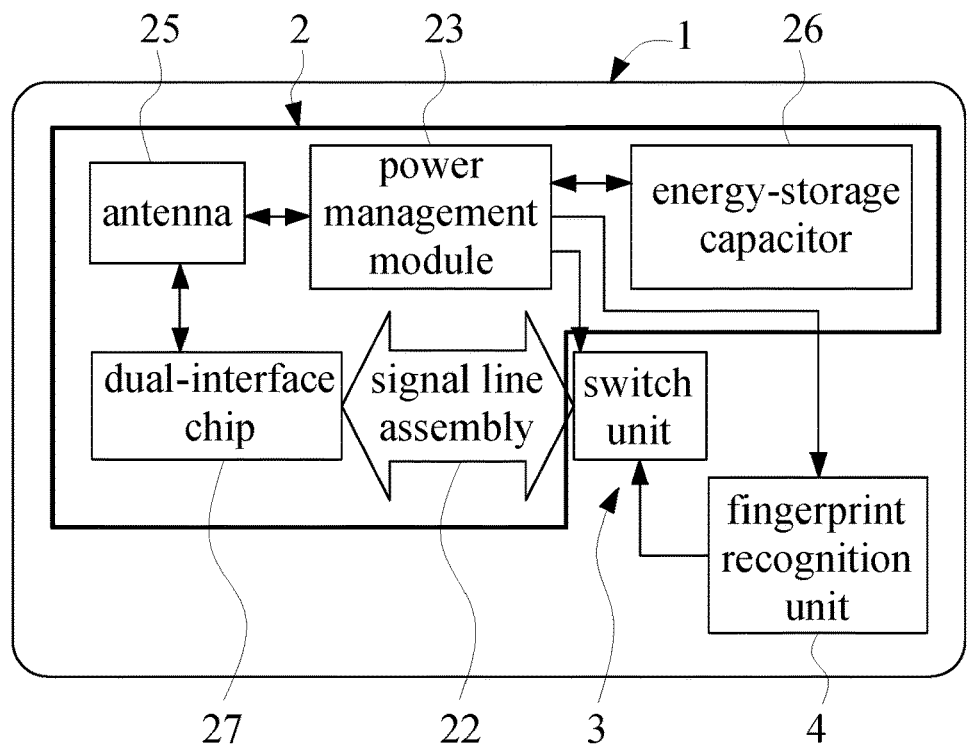
FIG. 6 is a block diagram of the fingerprint recognition smart card according to the third embodiment of the present disclosure.

Referring to FIG. 6, in the third embodiment of the present disclosure, the transaction processing unit 2 comprises a dual-interface chip 27, a signal line assembly 22, a power management module 23, an antenna 25, and an energy-storage capacitor 26. The dual-interface chip 27 is circuit-connected to the signal line assembly 22, the power management module 23, and the antenna 25. The signal line assembly 22 is circuit-connected to the switch unit 3. The power management module 23 is circuit-connected to the antenna 25, the energy-storage capacitor 26, the switch unit 3, and the fingerprint recognition unit 4. The switch unit 3 is connected to the ground line, reset signal line, clock signal line, data transmission signal line, first antenna-end signal line, and second antenna-end signal line (not shown) of the signal line assembly 22. Therefore, the present disclosure provides a battery-free, dual-interface fingerprint recognition smart card.

The differences between this embodiment and the preceding embodiments are explained below. In this embodiment, the transaction processing unit 2 has the dual-interface chip 27. In this embodiment, the card body 1 is inserted into the reading apparatus to enable the dual-interface chip 27 to come into electrical contact with the reading apparatus such that the reading apparatus can supply power through the dual-interface chip 27 to generate and transmit power to the dual-interface chip 27, thereby allowing the transaction processing unit 2 to conduct a contact transaction. Moreover, the user puts the card body 1 near the reading apparatus such that the antenna 25 receives electromagnetic wave from the reading apparatus to generate, by sensing, and transmit power to the dual-interface chip 27, thereby allowing the transaction processing unit 2 to conduct a non-contact transaction. Both the contact transaction and the non-contact transaction are conducted, using the external power received by the reading apparatus. The power management module 23 stabilizes the operating voltage, and a portion of power is stored in the energy-storage capacitor 26. The fingerprint recognition unit 4 receives and analyzes the cardholder's fingerprint data. Depending on an analysis result of the fingerprint recognition unit 4, the switch unit 3 renders the switch unit 3 open such that the ground line and reset signal line of the signal line assembly 22 are not connected (i.e., are separated from each other and thus do not interfere with each other), allowing the switch unit 3 to function and start the transaction processing unit 2 so as to permit transactions. Depending on an analysis result of the fingerprint recognition unit 4, the switch unit 3 renders the switch unit 3 closed such that the ground line and reset signal line of the signal line assembly 22 connect to each other and thus interfere with each other to the detriment of operation thereof, thereby causing the switch unit 3 to shut down the transaction processing unit 2 and thus preclude any transaction. Therefore, the fingerprint recognition smart card enhances transaction safety and convenience.

Figure 7:
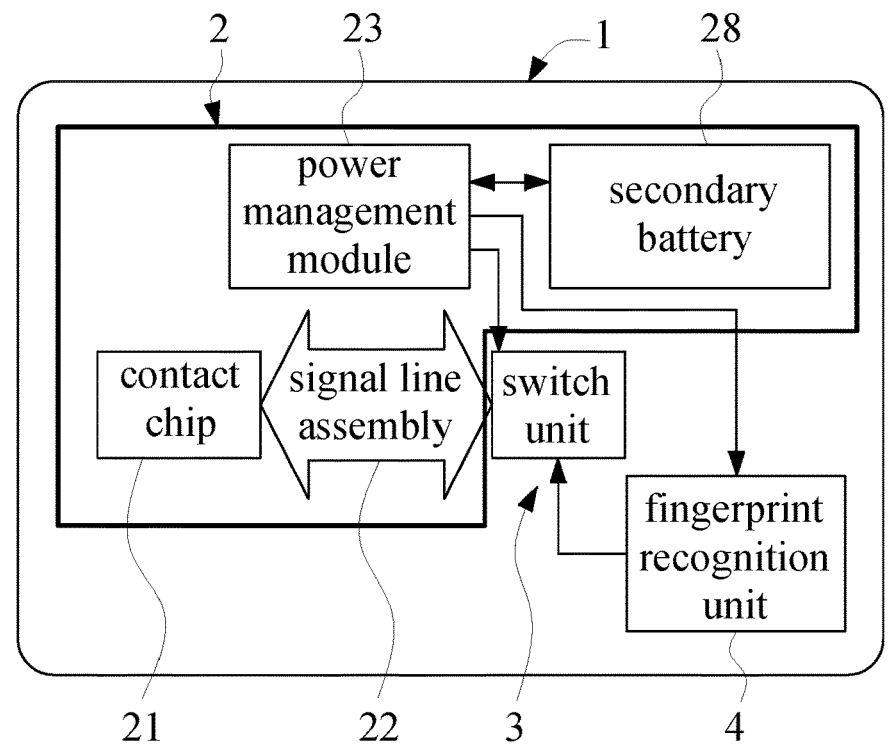
FIG. 7 is a block diagram of the fingerprint recognition smart card according to the fourth embodiment of the present disclosure.

Referring to FIG. 7, in the fourth embodiment of the present disclosure, the transaction processing unit 2 comprises a contact chip 21, a signal line assembly 22, a power management module 23, and a secondary battery 28. The contact chip 21 is circuit-connected to the signal line assembly 22 and the power management module 23. The signal line assembly 23 is circuit-connected to the switch unit 3. The power management module 23 is circuit-connected to the secondary battery 28, the switch unit 3, and the fingerprint recognition unit 4. Therefore, the present disclosure provides a battery-powered, contact fingerprint recognition smart card.

The differences between this embodiment and the preceding embodiments are explained below. In this embodiment, the transaction processing unit 2 has the secondary battery 28. In this embodiment, the card body 1 is inserted into the reading apparatus to enable the contact chip 21 to come into electrical contact with the reading apparatus such that the reading apparatus can generate and transmit power to the contact chip 21. The power management module 23 stores a portion of the power in the secondary battery 28 such that the reading apparatus supplies power to the transaction processing unit 2, the switch unit 3, and the fingerprint recognition unit 4 through the contact chip 21, allowing the contact transaction described in the first embodiment to be conducted. Power from the secondary battery 28 serves as backup power for use in a related situation, for example, when the contact chip 21 fails to receive power from the reading apparatus. Therefore, the fingerprint recognition smart card meets user needs.

Figure 8:
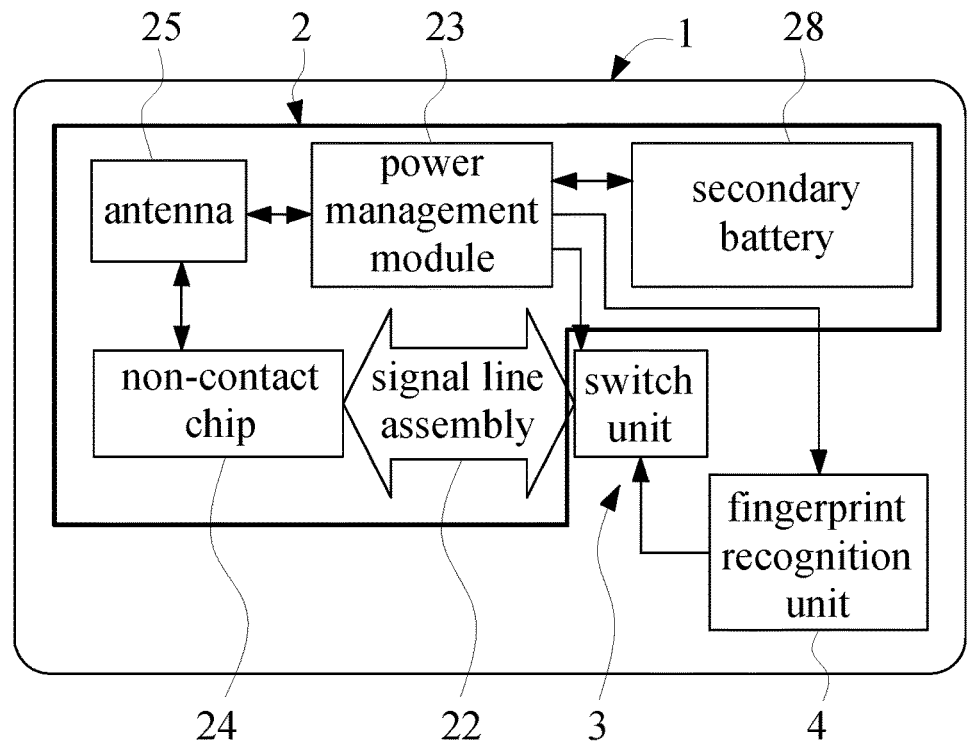
FIG. 8 is a block diagram of the fingerprint recognition smart card according to the fifth embodiment of the present disclosure.

Referring to FIG. 8, in the fifth embodiment of the present disclosure, the transaction processing unit 2 comprises a non-contact chip 24, a signal line assembly 22, a power management module 23, an antenna 25, and a secondary battery 28. The non-contact chip 24 is circuit-connected to the signal line assembly 22 and the antenna 25. The signal line assembly 22 is circuit-connected to the switch unit 3. The power management module 23 is circuit-connected to the antenna 25, the secondary battery 28, the switch unit 3, and the fingerprint recognition unit 4. Therefore, the present disclosure provides a battery-powered, non-contact fingerprint recognition smart card.

The differences between this embodiment and the fourth embodiment are explained below. In this embodiment, the secondary battery 28 of the transaction processing unit 2 is charged with the non-contact chip 24. In this embodiment, the cardholder puts the card body 1 near the reading apparatus (not shown) such that the antenna 25 receives electromagnetic wave from the reading apparatus so as to generate, by sensing, and transmit power to the non-contact chip 24. The power management module 23 stores a portion of the power in the secondary battery 28 to allow the reading apparatus to supply power to the transaction processing unit 2, the switch unit 3, and the fingerprint recognition unit 4 through the non-contact chip 24, allowing the non-contact transaction described in the second embodiment to be conducted. Power from the secondary battery 28 serves as backup power for use in a related situation, for example, when the non-contact chip 24 fails to receive power from the reading apparatus. Therefore, the fingerprint recognition smart card meets user needs.

Figure 9:
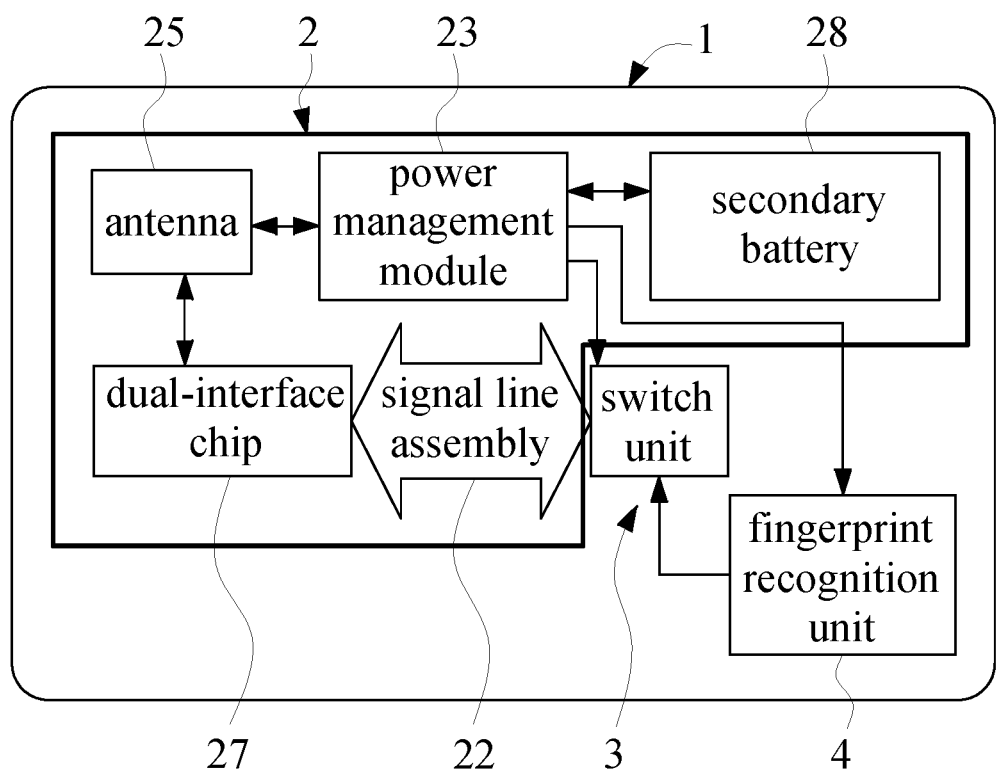
FIG. 9 is a block diagram of the fingerprint recognition smart card according to the sixth embodiment of the present disclosure.

Referring to FIG. 9, in the sixth embodiment of the present disclosure, the transaction processing unit 2 comprises a dual-interface chip 27, a signal line assembly 22, a power management module 23, an antenna 25, and a secondary battery 28. The dual-interface chip is circuit-connected to the signal line assembly, the power management module, and the antenna. The signal line assembly is circuit-connected to the switch unit. The power management module is circuit-connected to the antenna, the secondary battery, the switch unit, and the fingerprint recognition unit. Therefore, the present disclosure provides a battery-powered, dual-interface fingerprint recognition smart card.

The differences between this embodiment and the preceding embodiments are explained below. In this embodiment, the secondary battery 28 of the transaction processing unit 2 is charged with the dual-interface chip 27. In practice, the card body 1 is inserted into the reading apparatus to enable the dual-interface chip 27 to come into electrical contact with the reading apparatus such that the reading apparatus can supply power to the dual-interface chip 27. At this point in time, the power management module 23 stores a portion of the power in the secondary battery 28. Moreover, the cardholder puts the card body 1 near the reading apparatus (not shown) such that the antenna 25 receives electromagnetic wave from the reading apparatus so as to generate, by sensing, and transmit power to the dual-interface chip 27. The power management module 23 stores a portion of the power in the secondary battery 28 to allow the reading apparatus to supply power to the transaction processing unit 2, the switch unit 3, and the fingerprint recognition unit 4 through the dual-interface chip 27, so as to conduct the contact transaction or non-contact transaction described in the third embodiment. Power from the secondary battery 28 serves as backup power for use in a related situation, for example, when the dual-interface chip 27 fails to receive power from the reading apparatus. Therefore, the fingerprint recognition smart card meets user needs.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent modifications and replacements made to the aforesaid embodiments shall fall within the scope of the present disclosure. Accordingly, the legal protection for the present disclosure shall be defined by the appended claims.

What is claimed is:

1. A fingerprint recognition smart card, comprising:
   a card body;
   a transaction processing unit disposed at the card body to function as a power supply and conduct a transaction with a reading apparatus;
   a switch unit disposed at the card body and circuit-connected to the transaction processing unit to start or shut down the transaction processing unit; and
   a fingerprint recognition unit disposed at the card body and circuit-connected to the transaction processing unit and the switch unit to receive and analyze a cardholder's fingerprint data and thereby start or shut down the transaction processing unit in accordance with an analysis result of the fingerprint recognition unit;
   wherein the transaction processing unit comprises a signal line assembly, the signal line assembly being circuit-connected to the switch unit;
   when the fingerprint recognition unit renders the switch unit opened, a ground line and a reset signal line of the signal line assembly are not connected, the switch unit starts the transaction processing unit;
   when the fingerprint recognition unit renders the switch unit closed, the ground line and the reset signal line of the signal line assembly are connected, the switch unit shuts down the transaction processing unit.

2. The fingerprint recognition smart card of claim 1, wherein the transaction processing unit comprises a contact chip, and a power management module, the contact chip being circuit-connected to the signal line assembly and the power management module, and the power management module being circuit-connected to the switch unit and the fingerprint recognition unit.

3. The fingerprint recognition smart card of claim 1, wherein the transaction processing unit comprises a non-contact chip, a power management module, an antenna, and an energy-storage capacitor, the non-contact chip being circuit-connected to the signal line assembly and the antenna, and the power management module being circuit-connected to the antenna, the energy-storage capacitor, the switch unit, and the fingerprint recognition unit.

4. The fingerprint recognition smart card of claim 3, wherein the energy-storage capacitor is a hard supercapacitor or a flexible supercapacitor.

5. The fingerprint recognition smart card of claim 1, wherein the transaction processing unit comprises a dual-interface chip, a power management module, an antenna, and an energy-storage capacitor, the dual-interface chip being circuit-connected to the signal line assembly, the power management module, and the antenna, and the power management module being circuit-connected to the antenna, the energy-storage capacitor, the switch unit, and the fingerprint recognition unit.

6. The fingerprint recognition smart card of claim 5, wherein the energy-storage capacitor is a hard supercapacitor or a flexible supercapacitor.

7. The fingerprint recognition smart card of claim 1, wherein the transaction processing unit comprises a contact chip, a power management module, and a secondary battery, the contact chip being circuit-connected to the signal line assembly and the power management module, and the power management module being circuit-connected to the secondary battery, the switch unit, and the fingerprint recognition unit.

8. The fingerprint recognition smart card of claim 1, wherein the transaction processing unit comprises a non-contact chip, a power management module, an antenna, and a secondary battery, the non-contact chip being circuit-connected to the signal line assembly and the antenna, and the power management module being circuit-connected to the antenna, the secondary battery, the switch unit, and the fingerprint recognition unit.

9. The fingerprint recognition smart card of claim 1, wherein the transaction processing unit comprises a dual-interface chip, a power management module, an antenna, and a secondary battery, the dual-interface chip being circuit-connected to the signal line assembly, the power management module, and the antenna, and the power management module being circuit-connected to the antenna, the secondary battery, the switch unit, and the fingerprint recognition unit.

10. The fingerprint recognition smart card of claim 1, wherein the switch unit comprises an MOSFET, a diode, a plurality of resistors, a plurality of capacitors, and a bipolar junction transistor (BJT), the MOSFET being connected to the fingerprint recognition unit, the diode being connected to the MOSFET, with the MOSFET connected to the resistors and the capacitors, and the bipolar junction transistor being connected to the diode, one of the resistors, and one of the capacitors, with the bipolar junction transistor connected to the transaction processing unit through the resistor.

11. The fingerprint recognition smart card of claim 1, wherein the switch unit comprises an MOSFET, a diode, a plurality of resistors, a plurality of capacitors, and a bipolar junction transistor (BJT), the MOSFET being connected to the fingerprint recognition unit, the diode being connected to the MOSFET, with the MOSFET connected to the resistors and the capacitors, and the bipolar junction transistor being connected to the diode, one of the resistors, one of the capacitors, and the transaction processing unit.

* * * * *